(12) United States Patent
Taniguchi (10) Patent No.: US 12,404,675 B2
(45) Date of Patent: Sep. 2, 2025

(54) SUSPENDER

(71) Applicant: Murata Machinery, Ltd., Kyoto (JP)

(72) Inventor: Hiroto Taniguchi, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 18/033,518

(22) PCT Filed: Sep. 14, 2021

(86) PCT No.: PCT/JP2021/033703
§ 371 (c)(1),
(2) Date: Apr. 24, 2023

(87) PCT Pub. No.: WO2022/091612
PCT Pub. Date: May 5, 2022

(65) Prior Publication Data
US 2023/0392374 A1 Dec. 7, 2023

(30) Foreign Application Priority Data

Oct. 26, 2020 (JP) ................................ 2020-179085

(51) Int. Cl.
*E04B 9/00* (2006.01)
*B65G 1/04* (2006.01)
(Continued)

(52) U.S. Cl.
CPC ............... *E04B 9/006* (2013.01); *B65G 1/04* (2013.01); *F16M 11/043* (2013.01); *F16M 11/2085* (2013.01); *F16M 13/027* (2013.01)

(58) Field of Classification Search
CPC .. E04B 9/006; F16M 11/2085; F16M 13/027; B65G 1/04
See application file for complete search history.

(56) References Cited

U.S. PATENT DOCUMENTS

| 2,650,056 A | * | 8/1953 | Masoner | ................. E04B 9/006 248/323 |
| 2,963,251 A | * | 12/1960 | Fuss | ........................ F21V 21/00 248/228.6 |

(Continued)

FOREIGN PATENT DOCUMENTS

| CN | 2430407 Y | * | 5/2001 | ............... B65H 3/54 |
| CN | 104326369 A |  | 2/2015 | |

(Continued)

OTHER PUBLICATIONS

Extended Search Report dated Oct. 2, 2024, from counterpart European Application No. 21 88 5731.6.

(Continued)

*Primary Examiner* — Brent W Herring
(74) *Attorney, Agent, or Firm* — DLA Piper LLP (US)

(57) ABSTRACT

A suspender suspends an object via a grid-shaped groove provided in a ceiling included in a building. The suspender includes a fixed portion fixed to multiple places in the groove. The suspender includes a body portion that is connected to the fixed portion and that suspends the object. A first guide portion extending in a first direction for connecting the fixed portion and the body portion is provided at the fixed portion or the body portion, and a connecting position of the body portion can be changed. A second guide portion that is used for suspending the object and that extends in a second direction is provided. The suspender can change a suspending position of the object.

9 Claims, 12 Drawing Sheets

(51) Int. Cl.
  *F16M 11/04* (2006.01)
  *F16M 11/20* (2006.01)
  *F16M 13/02* (2006.01)

(56) References Cited

U.S. PATENT DOCUMENTS

| | | | | |
|---|---|---|---|---|
| 3,181,274 | A | * | 5/1965 | Izenour .................. A47F 5/0892 |
| | | | | 52/39 |
| 3,459,399 | A | * | 8/1969 | Everson .................. E04B 9/006 |
| | | | | 52/39 |
| 4,109,305 | A | * | 8/1978 | Claussen ................. F21S 8/063 |
| | | | | 362/225 |
| 7,250,922 | B2 | * | 7/2007 | Sakaniwa .............. A61B 6/463 |
| | | | | 600/407 |
| 7,712,239 | B2 | * | 5/2010 | Pitcher ...................... G09F 7/18 |
| | | | | 52/39 |
| 2008/0128376 | A1 | * | 6/2008 | Taniguchi ............ B65G 1/0435 |
| | | | | 212/322 |
| 2016/0363263 | A1 | * | 12/2016 | Stockham ............... G09F 7/205 |
| 2017/0101779 | A1 | * | 4/2017 | Schreiber ............. F16M 13/027 |

FOREIGN PATENT DOCUMENTS

| | | |
|---|---|---|
| JP | H09-279750 A | 10/1997 |
| JP | 2007-126924 A | 5/2007 |
| JP | 2020-056464 A | 4/2020 |
| WO | 2020/153040 A1 | 7/2020 |

OTHER PUBLICATIONS

International Search Report dated Nov. 22, 2021 in counterpart International Application No. PCT/JP2021/033703 w/English translation.

Written Opinion dated Nov. 22, 2021 in counterpart International Application No. PCT/JP2021/033703.

* cited by examiner

SUSPENDER

TECHNICAL FIELD

This disclosure relates to a suspender.

BACKGROUND

A ceiling suspended from a building is known (for example, see Japanese Unexamined Patent Application Publication No. 2007-126924). In such a ceiling, for example, a plurality of rectangular-shaped frame members are arranged in a matrix and a grid-shaped groove is formed between the plurality of frame members. A suspender is attached via this groove and an object to be suspended is held via this suspender.

In the ceiling, a plurality of frames are coupled by a coupling member at an intersection point of grooves and this coupling member is suspended from a building, thus any grooves may not be formed at this intersection point area. Further, equipment such as a sprinkler may have already been suspended from a part of the grooves of the frames. Thus, a suspender cannot be attached to an area around an intersection point of grooves and around the equipment and therefore there exists a problem that an object to be suspended cannot be easily suspended, for example, a special suspender is required.

It could therefore be helpful to provide a suspender capable of increasing degrees of freedom of a suspending position of an object to be suspended which is suspended from a ceiling.

SUMMARY

We thus provide a suspender that suspends an object to be suspended via a grid-shaped groove provided at a ceiling included in a building and includes a fixed portion fixed to multiple places in the groove and a body portion connected to the fixed portion and configured to suspend the object to be suspended. A first guide portion configured to connect the fixed portion and the body portion to each other and extending in a first direction is provided at the fixed portion or the body portion. A connecting position of the body portion with respect to the fixed portion can be changed within a range of a length of the first guide portion. A second guide portion configured to suspend the object to be suspended and extending in a second direction different from the first direction is provided at the body portion. A suspending position of the object to be suspended with respect to the body portion can be changed within a range of a length of the second guide portion.

The suspender can change a position of the object to be suspended in the first direction and the second direction within a range of a length of the first guide portion and within a range of a length of the second guide portion and can increase degree of freedom of position to suspend the object to be suspended.

The first direction may be parallel to a groove of said grid-shaped groove, which extends in a predetermined direction out of the grid-shaped groove and the second direction may be parallel to a groove of the grid-shaped groove, which extends in a direction intersecting with the predetermined direction out of the grid-shaped groove. The suspender can change a position of the object to be suspended with respect to the fixed portion in a direction in which the grid-shaped groove extends.

The fixed portion may include a plurality of suspending portions fixed to the groove and a plate-shaped body attached to lower ends of the plurality of suspending portions and expanding horizontally. In the suspender, the suspending portion and plate-shaped body can have an appropriate shape according to the intended use such as suspending load. Therefore the suspender can suspend stably an object to be suspended.

The plurality of suspending portions may include a first suspending portion fixed to a first position in the groove, a second suspending portion fixed to a second position in the groove, the second position different from the first position, and a third suspending portion fixed to a third position in the groove, the third position different from the first position and the second position. The plate-shaped body may include a first portion fixed to a lower portion of the first suspending portion and extending in the first direction, a second portion fixed to a lower portion of the second suspending portion and extending in the first direction, and a third portion fixed to a lower portion of the third suspending portion, extending in the second direction, and connected to each of the first portion and the second portion. Each first guide portion may be provided at the first portion and the second portion. The plate-shaped body is held by the plurality of suspending portions, therefore, the suspender can surely hold the plate-shaped body. Further, when equipment has been installed in the groove, interference with the equipment can be avoided by a space between the first portion and second portion.

The body portion may include a first raceway connected to the first guide portion of the first portion and extending in the second direction and a second raceway separately from the first raceway, connected to the first guide portion of the second portion, and extending in the second direction. The first raceway and the second raceway may each include the second guide portion. The suspender can increase degree of freedom of suspending positions of objects to be suspended which is suspended from the raceways by increasing degree of freedom of locations of two raceways.

The body portion may include a straight member connected to each of a lower end of the first raceway and a lower end of the second raceway and extending in the second direction and the straight member may include the second guide portion. The suspender can suspend an object to be suspended below a space between the first raceway and the second raceway via the straight member.

The body portion may be connected to each of the first guide portion of the first portion and the first guide portion of the second portion and may extend in the second direction. The second guide portion may be provided at the body portion. The suspender can suspend an object to be suspended below a space between the first portion and the second portion in the plate-shaped body via the body portion.

The plurality of suspending portions may include a fourth suspending portion fixed to a fourth position in the groove and a fifth suspending portion fixed to a fifth position in the groove, the fifth position different from the fourth position. The plate-shaped body may include a fourth portion fixed to a lower end of the fourth suspending portion and extending in the first direction, and a fifth portion fixed to a lower end of the fifth suspending portion, extending in the second direction, and connected to the fourth portion. The first guide portion may be provided at the fourth portion. The body portion may include a third raceway connected to the first guide of the fourth portion and extending in the second direction. The third raceway may include the second guide portion. The third raceway is guided in the first direction by the first guide portion so that the suspender can increase degree of freedom of a suspending position of an object to be suspended which is suspended from the second guide portion of the third raceway.

The fixed portion may include a sixth suspending portion fixed to a sixth position in the groove and a seventh suspending portion fixed to a seventh position in the groove, the seventh position different from the sixth position. The body portion may be a plate-shaped member attached to lower portions of the sixth suspending portion and seventh suspending portion and expanding horizontally and may include a first arc-shaped guide portion is the first guide portion corresponding to the sixth suspending portion, a second arc-shaped guide portion is the first guide portion corresponding to the seventh suspending portion, and the second guide portion extending straight. The first arc-shaped guide portion and the second arc-shaped guide portion may have an arc-shape centering on a common point and may face to each other at both sides of the common point interposed therebetween, and the second guide portion may extend between the first arc-shaped guide portion and the second arc-shaped guide portion in a plan view. By rotating the body portion around the common point, the suspender can increase degree of freedom of a suspending position of an object to be suspended which is suspended from the second guide portion.

The above-described brief summary does not enumerate all required features. Further, sub-combination of these groups of features also can be an invention.

REFERENCE SIGNS LIST

100 Suspender
110 Fixed portion
111A First suspending portion
111B Second suspending portion
111C Third suspending portion
112 Plate-shaped body
112A First portion
112B Second portion
112C Third portion
113 Fixing tool
113A Upper flange
113B Lower flange
113C Coupling member
120 Body portion
121 First raceway
122 Second raceway
123 Straight member
124 Raceway
200 Suspender
220 Body portion
300 Suspender
310 Fixed portion
311D Fourth suspending portion
311E Fifth suspending portion
312 Plate-shaped body
312D Fourth portion
312E Fifth portion
320 Body portion
321 Third raceway
400 Suspender
410 Fixed portion
411F Sixth suspending portion
411G Seventh suspending portion
420 Body portion
B Building
C Ceiling
D1 First direction
D2 Second direction
F Frame member
G1 First guide portion
G2 Second guide portion
G3 First arc-shaped guide portion
G4 Second arc-shaped guide portion
H Suspension metal fitting
P1 First position
P2 Second position
P3 Third position
P4 Fourth position
P5 Fifth position
P6 Sixth position
P7 Seventh position
Q Object to be suspended
Q1 Suspension metal fitting
Q2 Hanger
S Equipment
V Groove

DETAILED DESCRIPTION

Hereinafter, our suspenders will be described through examples. However, the following examples do not limit the scope of this disclosure. Further, all of combinations of features described in the examples are not necessarily required to achieve the desired effects.

Figure 1:
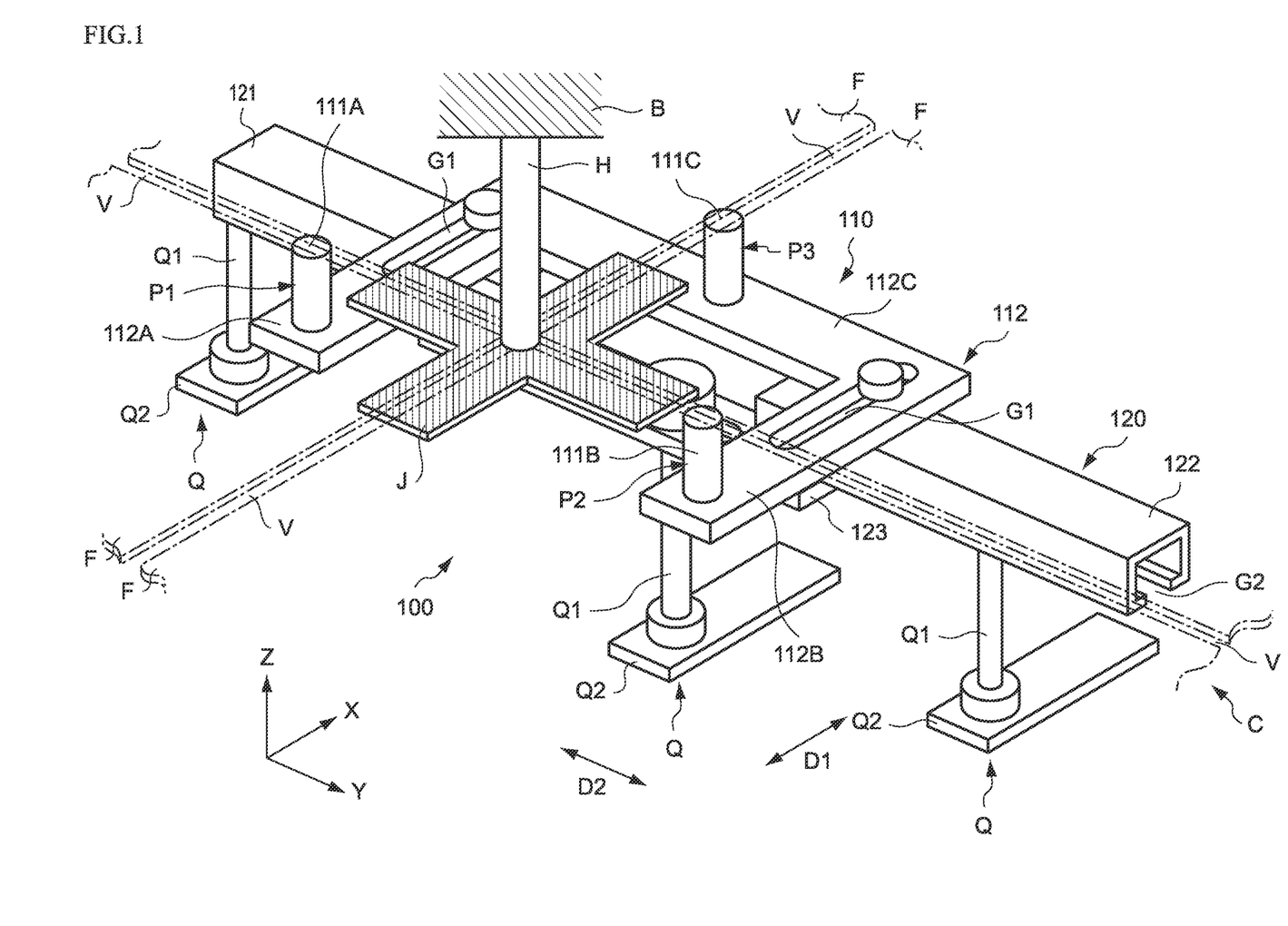
FIG. 1 is a perspective view illustrating an example of a suspender 100.
Figure 2:
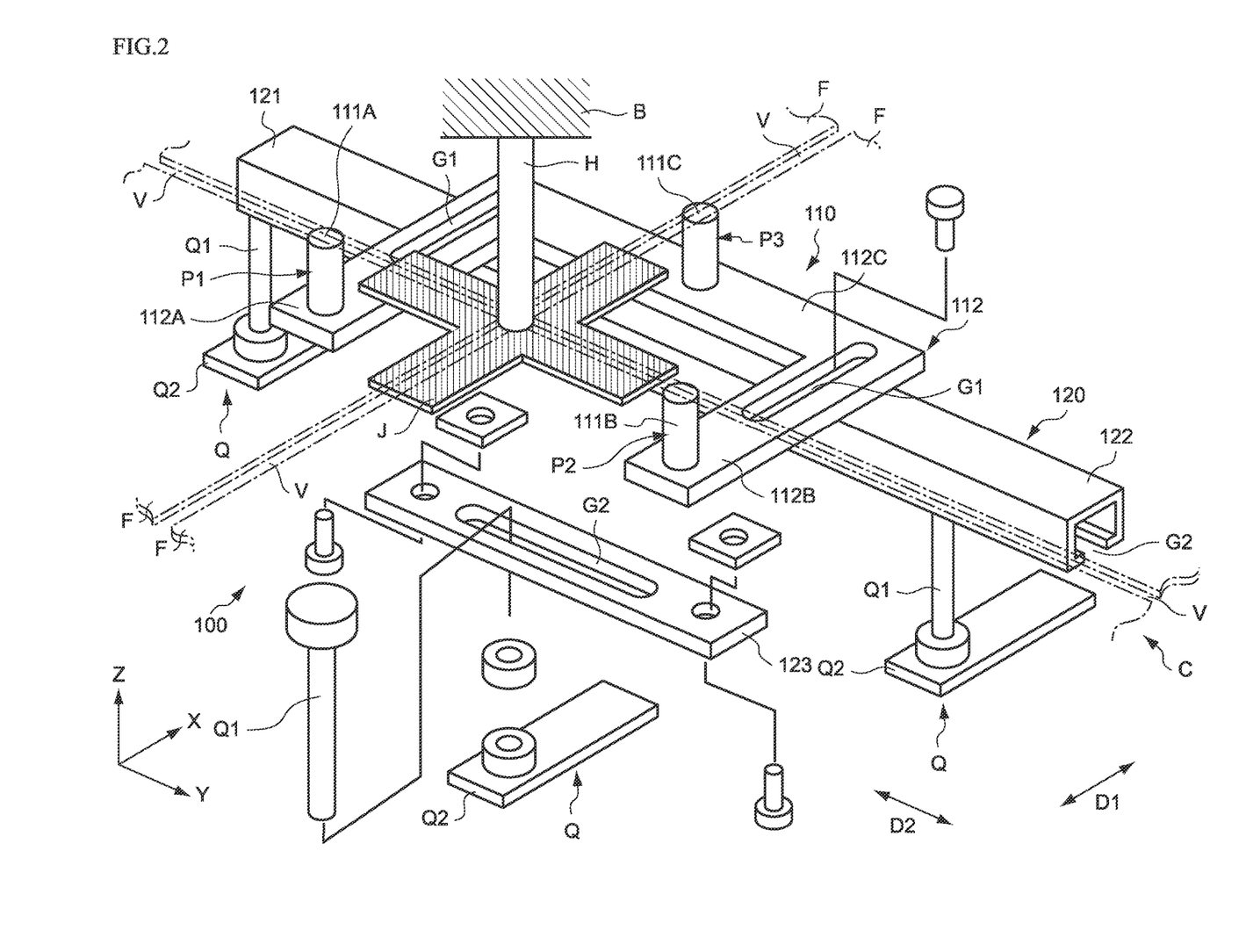
FIG. 2 is an exploded perspective view illustrating an example of a suspender 100.
Figure 3:
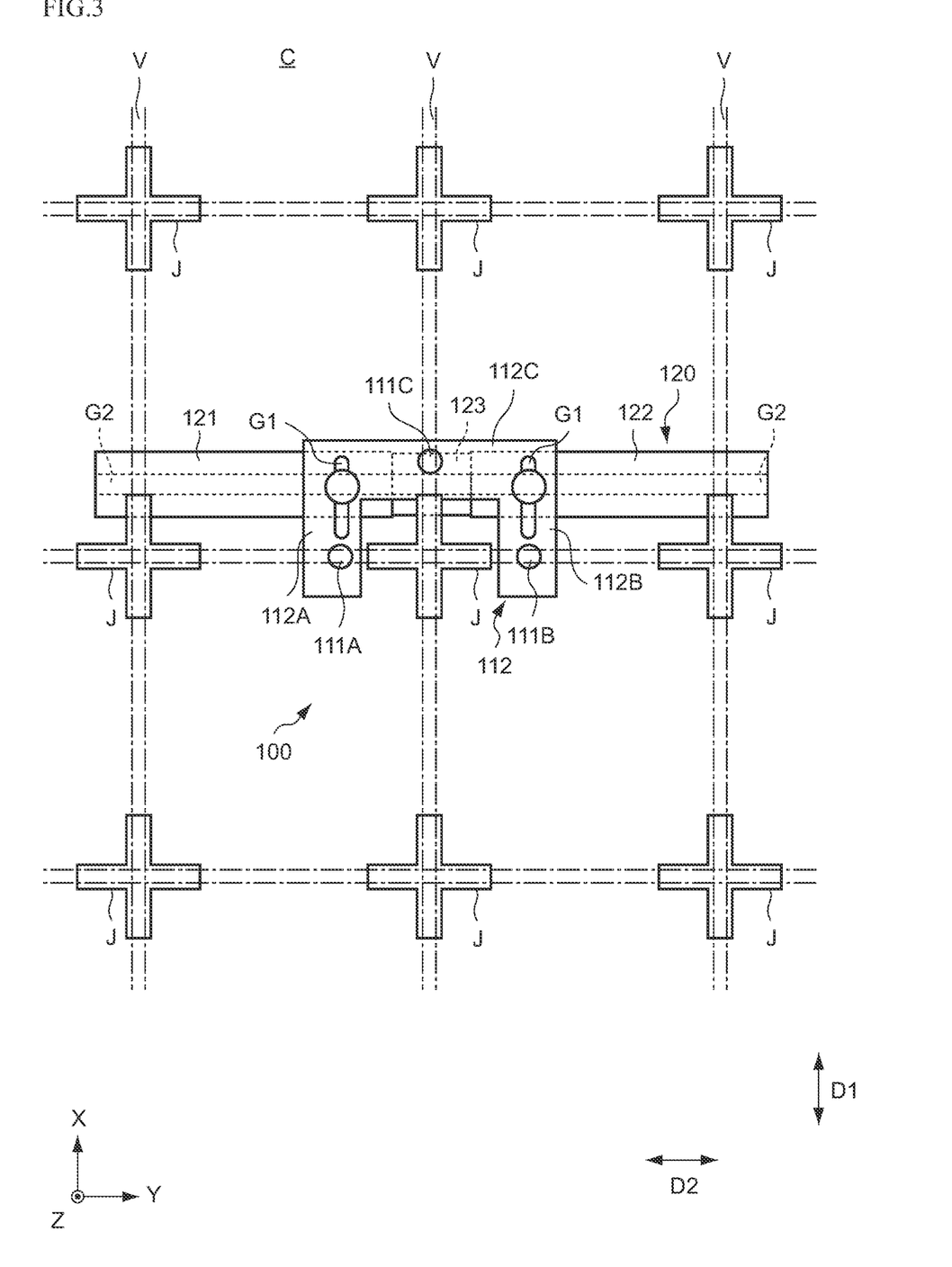
FIG. 3 is a plan view illustrating an example of a suspender 100.
Figure 4:
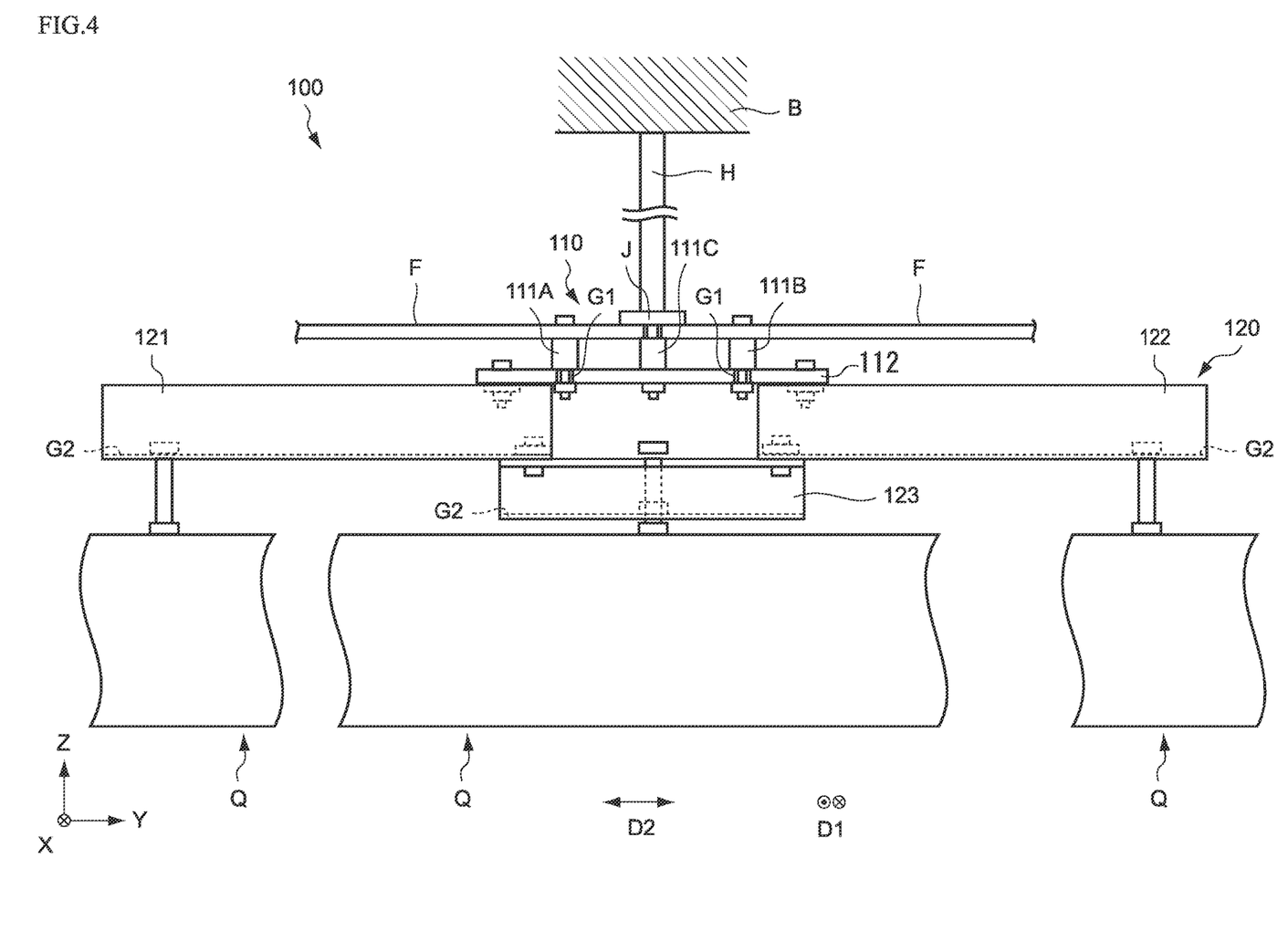
FIG. 4 is a side view illustrating an example of a suspender 100 viewed from a first direction.

FIG. 1 is a perspective view illustrating a first example of a suspender 100. FIG. 2 is an exploded perspective view illustrating an example of a suspender 100. FIG. 3 is a plan view illustrating an example of a suspender 100. FIG. 4 is a side view illustrating an example of a suspender 100 viewed from a first direction D1. In this example, an X direction as a first direction D1 and a Y direction as a second direction D2 are orthogonal to each other. A Z direction is perpendicular to an X-Y plane. The X direction, the Y direction, and the Z direction are a so-called right-handed system. Upper and above mean the +Z direction. Lower and below mean the −Z direction. The X direction is an example of "a predetermined direction." The Y direction is an example of "a direction intersected with a predetermined direction."

The suspender 100 is a member that suspends an object to be suspended Q via a grid-shaped groove V provided in a ceiling C included in a building B. An example of the building B includes, for example, a building of semiconductor factory. The ceiling C is suspended, for example, by a suspension metal fitting H from a ceiling portion of the building B. The ceiling C includes, for example, a plurality of rectangular frame members F arranged in a matrix, and a coupling member J that couples frame members F to each other. The coupling member J is coupled with the suspension metal fitting H and is arranged at every position where corners of four frame members F of a plurality of frame members F come together. The coupling member J couples corners of four frame members F to each other. The coupling member J is in a cross shape in a plan view. In the ceiling C, a grid-shaped groove V is formed among a plurality of frame members F. The first direction D1 is parallel to the groove V of the grid-shaped groove, which extends in the X direction. The second direction D2 is parallel to the groove V of the grid-shaped grooves V, which extends in the Y direction.

The suspender 100 includes a fixed portion 110 and a body portion 120. The fixed portion 110 is a member fixed to several places in the groove V. The fixed portion 110 includes a first suspending portion 111A, a second suspending portion 111B, a third suspending portion 111C, and a plate-shaped body 112. The first suspending portion 111A, the second suspending portion 111B, and the third suspending portion 111C are fixed to the groove V.

The first suspending portion 111A is fixed to a first portion P1 in the groove V. The second suspending portion 111B is fixed to a second position P2 in the groove V. The second position P2 is a different position from the first position P1. The third suspending portion 111C is fixed to a third portion P3 in the groove V. The third position P3 is a different position from the first position P1 and the second position P2. The first suspending portion 111A, the second suspending portion 111B and the third suspending portion 111C are arranged in a state where heights of lower ends thereof are the same.

The plate-shaped body 112 is attached to a lower end of a plurality of suspending portions 111 and expands in a horizontal direction. The plate-shaped body 112 includes a first portion 112A, a second portion 112B, and a third portion 112C. The first portion 112A is fixed to a lower portion of the first suspending portion 111A and extends in the first direction D1. The second portion 112B is fixed to a lower portion of the second suspending portion 111B and extends in the first direction D1. The third portion 112C is fixed to a lower portion of the third suspending portion 111C and extends in the second direction D2. The third portion 112C is connected to each of the first portion 112A and the second portion 112B. The first portion 112 A, the second portion 112B, and the third portion 112C are arranged, for example, such that the plate-shaped body 112 has a C-shaped or U-shaped in a plan view.

A first guide portion G1 is provided at each of the first portion 112A and the second portion 112B. The first guide portion G1 connects the fixed portion 110 and the body portion 120 to each other. The guide portion G1 is an opening portion that vertically penetrates the plate-shaped body 112. The first guide portion G1 extends in the first direction D1. For example, a connecting position of the body portion 120 with respect to the fixed portion 110 can be changed within a range of length of the first guide portion G1.

The body portion 120 is connected with the fixed portion 110 and suspends an object to be suspended Q. The body portion 120 includes a first raceway 121, a second raceway 122, and a straight member 123. The first raceway 121 is connected to the first guide portion G1 of the first portion 112A. The first raceway 121 extends in the second direction D2. The second raceway 122 is connected to the first guide portion G1 of the second portion 112B separately from the first raceway 121. The second raceway 122 extends in the second direction D2. The first raceway 121 and the second raceway 122 are arranged side by side in the second direction D2.

Figure 6:
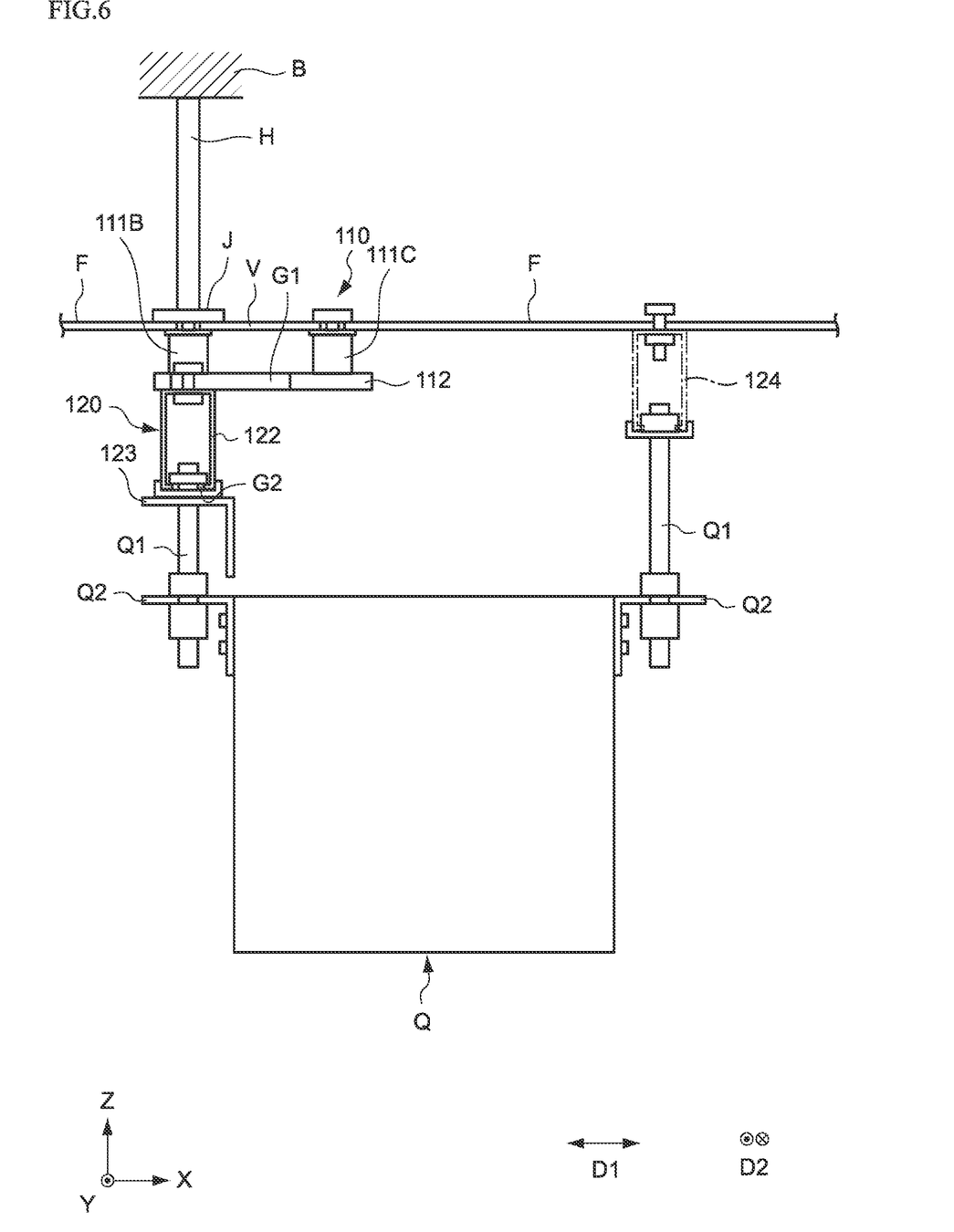
FIG. 6 is a side view illustrating an example of a suspender viewed from a second direction.

For example, the straight member 123 is plate-shaped and extends in the second direction D2. The straight member 123 is connected to a lower end of the first raceway 121 and to a lower end of the second raceway 122 with a connecting member such as bolt. An end portion of the straight member 123 in the first direction D1 is bent downwards to form an L-shape as shown in FIG. 6. With this configuration, a stiffness with respect to a vertical load is ensured.

The first raceway 121, the second raceway 122, and straight member 123 each include the second guide portion G2. The second guide portion G2 is an opening portion that penetrates vertically bottom portions of the first race way 121 and the second raceway 122 and the straight member 123. The second guide portion G2 extends in the second direction D2. A suspension metal fitting Q1 for an object to be suspended Q is inserted vertically into the second guide portion G2. A hunger Q2 is fixed to a lower end of the suspension metal fitting Q1 through a fixing a member such as a nut. The second guide portion G2 can change a position of the suspension metal fitting Q1 in the second direction D2. Changing a position of the suspension metal fitting Q1 in the second direction D2 enables a change of a connecting position of an object to be suspended Q with respect to the body portion 120 in the second D2. Further, the second guide G2 of the straight member 123 is arranged between the first raceway 121 and the second raceway 122 in the second direction D2. Therefore, the object to be suspended Q can be suspended via the straight member 123 below a space between the first raceway 121 and the second raceway 122. Further, the straight member 123 is not directly connected to the plate-shaped body 112, but it is connected via the first raceway 121 and the second raceway 122. Therefore, a large distance between the straight member 123 and the ceiling C is ensured. Thus, even when equipment such as a fire alarm or a sprinkler is arranged at the groove V of the ceiling C, the object to be suspended Q can be suspended without being interrupted by the equipment.

Figure 5:
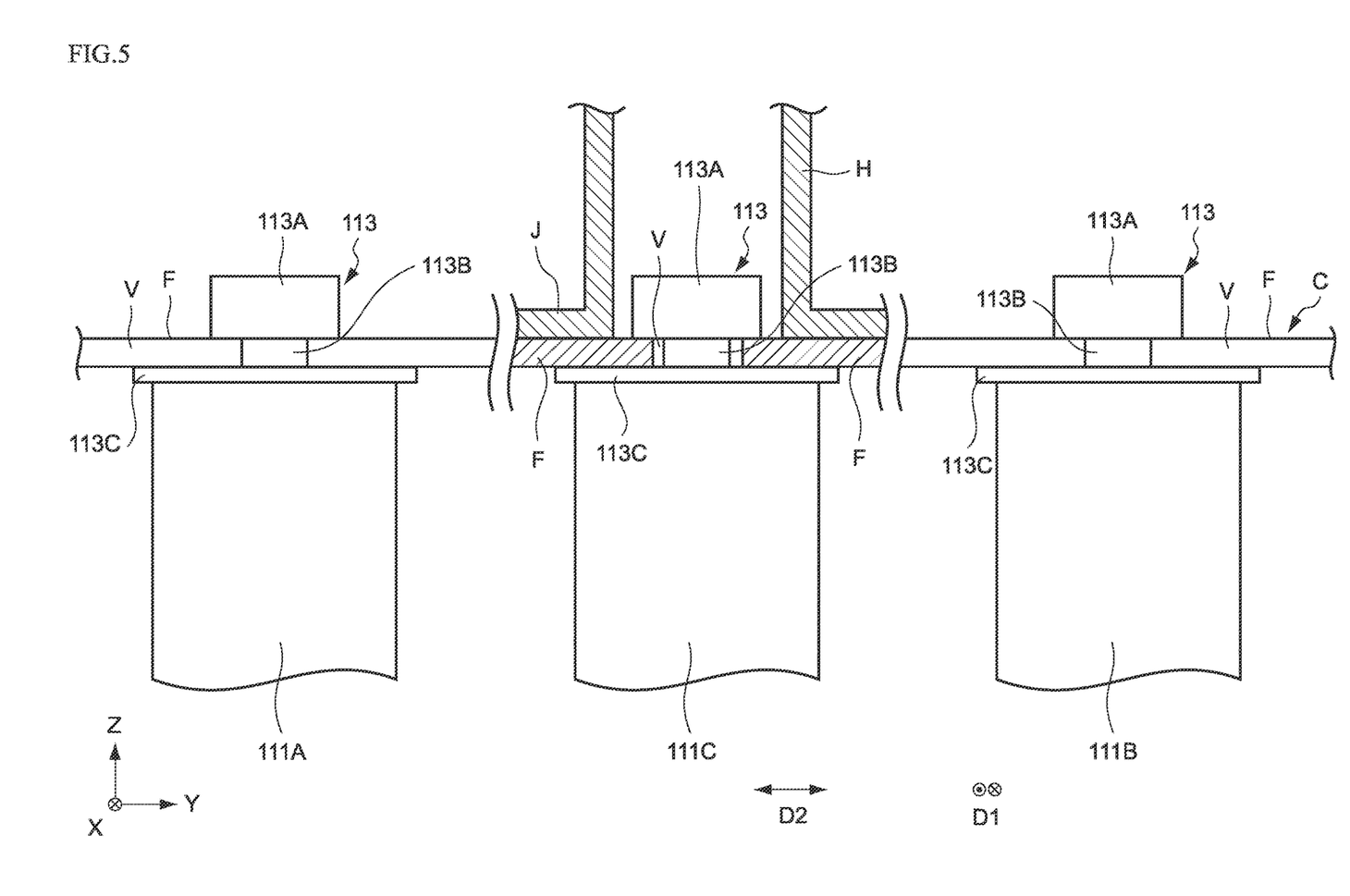
FIG. 5 is an enlarged view of cross-section of a ceiling.

FIG. 5 is an enlarged view of cross-section of the ceiling C. The first suspending portion 111A, the second suspending portion 111B, and the third suspending portion 111C are fixed to the groove V via a fixing tool 113 as shown in FIG. 5. The fixing tool 113 includes an upper flange 113A, a lower flange 113B, and a coupling member 113C. The upper flange 113A is arranged between upper surfaces of frame members F adjacent to each other. The lower flange 113B is arranged between lower surfaces of frame members F adjacent to each other. The coupling member 113C couples the upper flange 113A and the lower flange 113B to each other.

For example, the upper flange 113A is a rectangular plate-shaped member in a plan view and its length in the transverse direction is shorter than the width of the groove V. When using a fixing tool 113 including this upper flange 113A, a worker places the fixing tool 113 at a desired position below the groove such that a longer side of the upper flange 113A is parallel to the groove V. Then the worker inserts the upper flange 113A of the fixing tool 113 into the groove V and rotates the fixing tool 113 by 90 degrees. As a result, the fixing tool 113 can be fixed to a desired position in the groove V.

For example, the upper flange 113A may be two rectangular plate-shaped members in a plan view joined with a hinge and being able to be opened or closed by an operating member (not illustrated). When using a fixing tool 113 including this upper flange 113A, a worker places the fixing tool 113 at a desired position below the groove V in a state where the two plate-shaped members joined with a hinge are closed. Then, the worker inserts the upper flange 113A of the fixing tool 113 into the groove V and operates the operating member to open the two plate-shaped members. As a result, the fixing tool 113 can be fixed to a desired position in the groove V.

Figure 7:
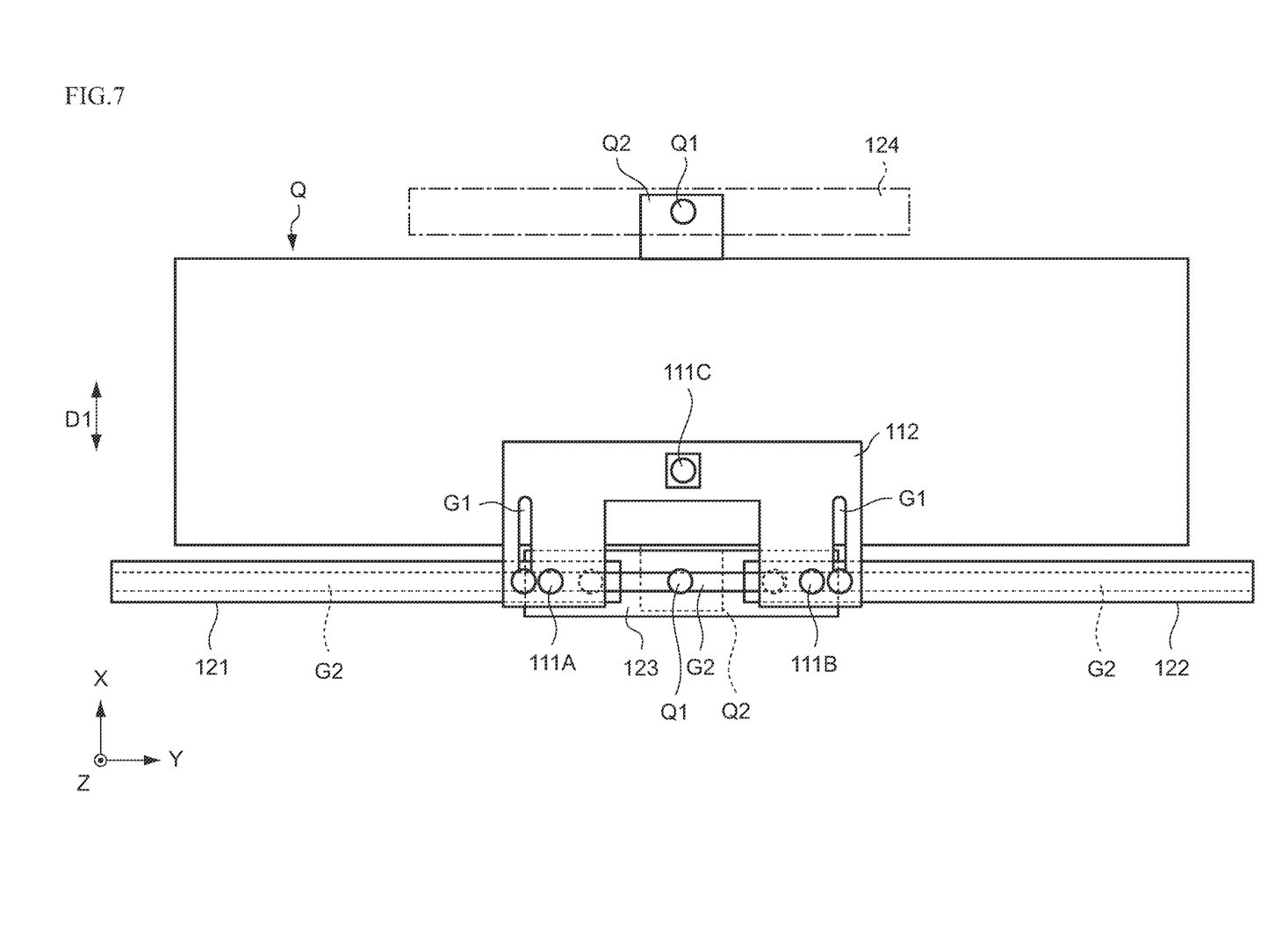
FIG. 7 is a plan view illustrating a configuration according to FIG. 6.

FIG. 6 is a side view illustrating an example of a suspender 100 viewed from a second direction D2. FIG. 7 is a plan view illustrating a configuration according to FIG. 6. An object to be suspended Q is supported by a suspension metal fitting Q1 suspended via the suspender 100 from the first raceway 121 and the second raceway 122 and another suspension metal fitting Q1 suspended from a raceway 124. The suspender 100 can change a position of the object to be suspended Q with respect to the fixed portion 110 in the first direction D1 within a range of length of the first guide portion G1. Therefore, even if a space between the grooves V adjacent to each other does not match the dimension of the object to be suspended Q, the object to be suspended Q can be suspended and degree of freedom of a suspending position can be increased.

The suspender 100 according to the first example includes the first guide portion G1, therefore it can change a position of the object to be suspended Q with respect to the fixed portion 110 in the first direction D1 within a range of a length of the first guide portion G1. Further, the suspender 100 according to the first example includes the second guide portion G2, therefore it can change a position of the object to be suspended Q with respect to the fixed portion 110 in the first second direction D2 within a range of a length of the second guide portion G2. Thereby, degree of freedom of a suspending position of the object to be suspended Q suspended from the ceiling can be increased.

Figure 8:
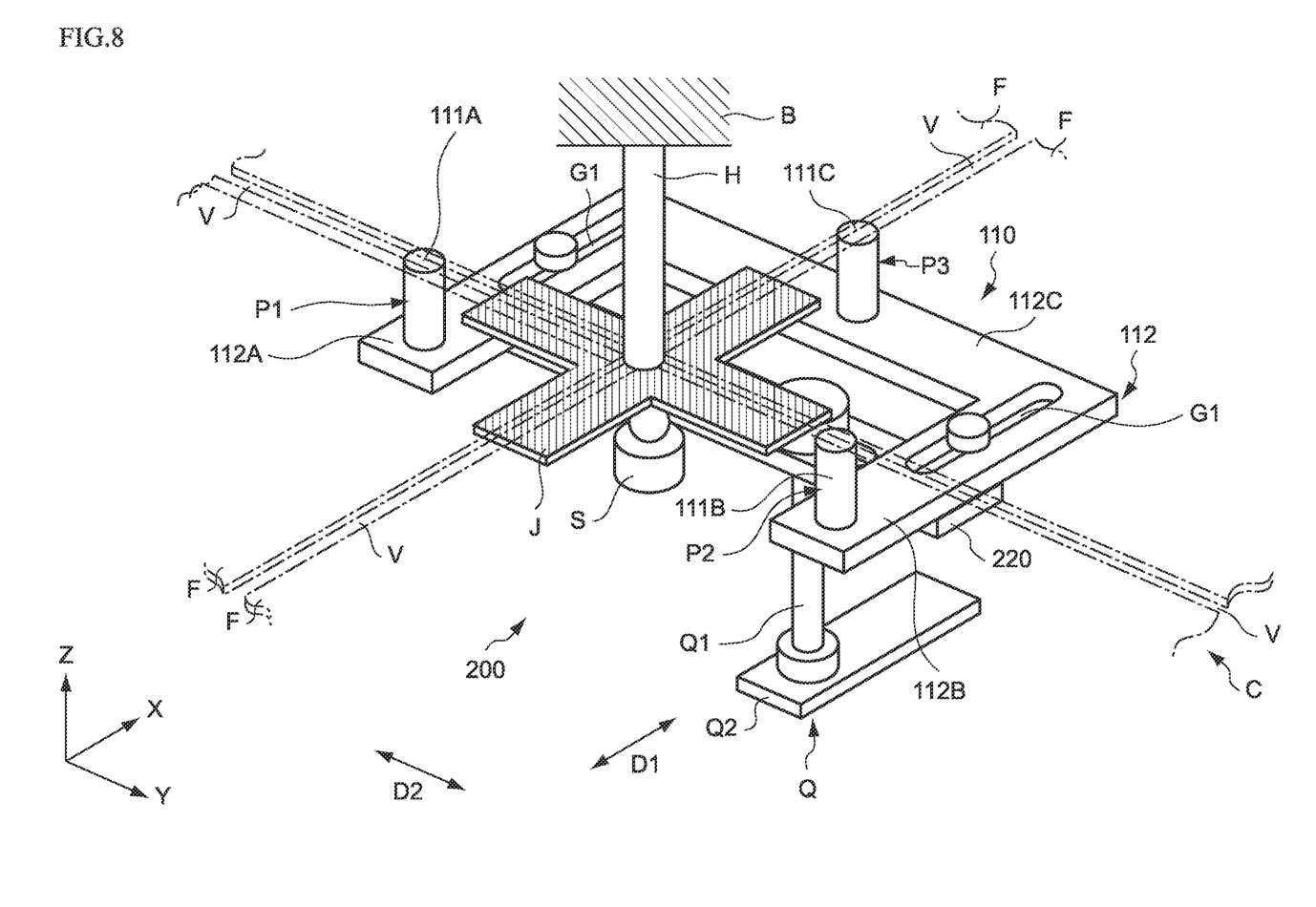
FIG. 8 is a perspective view illustrating an example of a suspender 200.
Figure 9:
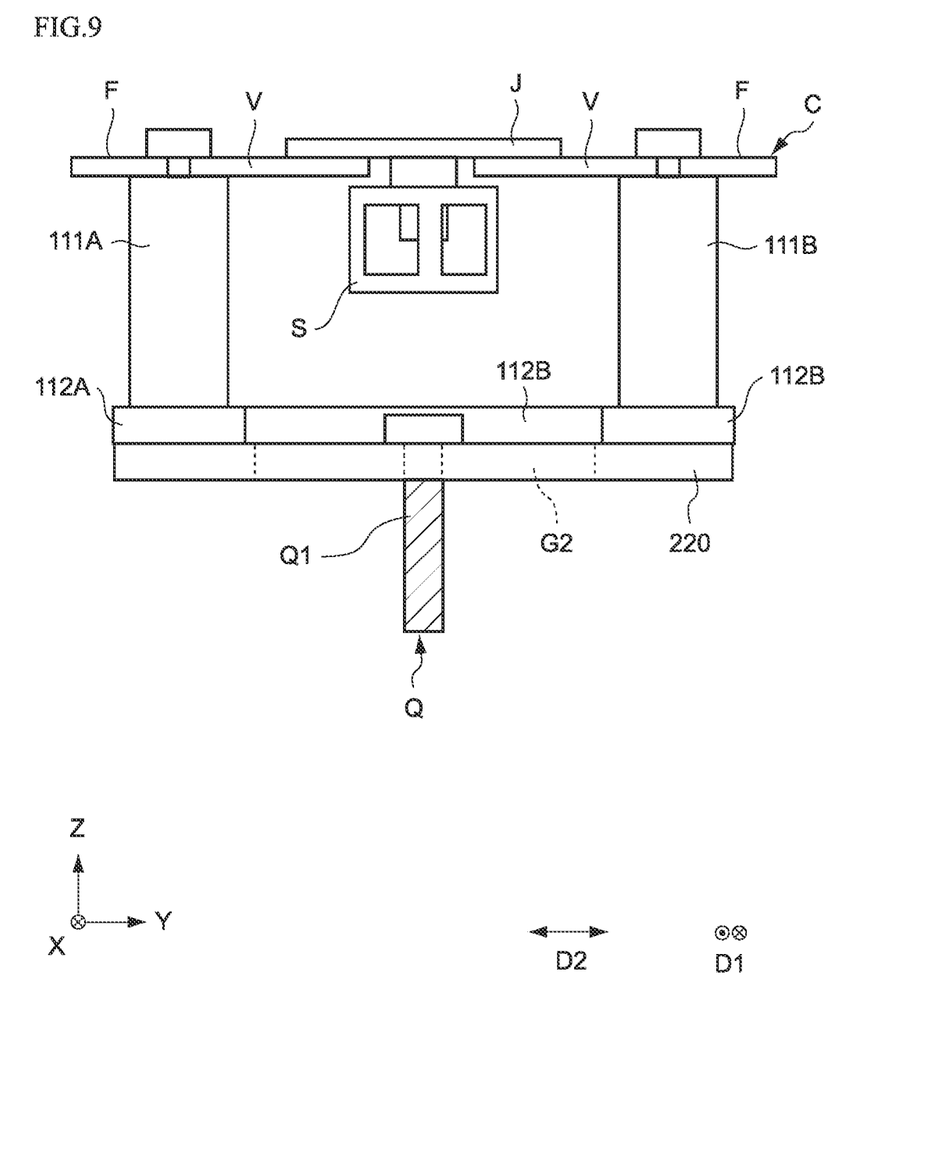
FIG. 9 is a side view illustrating an example of a suspender 200.

FIG. 8 is a perspective view illustrating an example of a suspender 200 of a second example. FIG. 9 is a side view illustrating an example of a suspender 200. The suspender 200 includes a fixed portion 110 and a body portion 220.

Configuration of the fixed portion 110 is the same as that of the fixed portion 110 according to the first example. The fixed portion 110 is arranged without being interrupted by equipment S such as fire alarm or a sprinkler arranged in the groove V of the ceiling C. In the second example, a first raceway 121 and a second raceway 122 cannot be provided at a body portion 220.

The body portion 220 is connected to the fixed portion 110 and suspends an object to be suspended Q. For example, the body portion 220 is plate-shaped and extends in the second direction D2. The body portion 220 is connected to each of the first guide portion G1 of the first portion 112A and the first guide portion G1 of the second portion 112B in the fixed portion 110 with a connecting member such as a bolt.

The body portion 220 includes a second guide portion G2. The second guide portion G2 is an opening portion that penetrates vertically the body portion 220. The second guide portion G2 extends in the second direction D2. A suspension metal fitting Q1 of an object to be suspended Q is inserted vertically into the second guide portion G2. The hunger Q2 is fixed to a lower end of the suspension metal fitting Q1 via a fixing member such as a nut. The second guide portion G2 can change a position of the suspension metal fitting Q1 in the second direction D2. Changing a position of the suspension metal fitting Q1 in the second direction D2 enables a change of a connecting position of the object to be suspended Q with respect to body portion 220 in the second direction D.

The suspender 200 of the second example can change a position of the object to be suspended Q with respect to the fixed portion 110 in the first direction D1 within a range of a length of the first guide portion G1. Further, the suspender 200 of the second example can change a position of the object to be suspended Q with respect to the fixed portion 110 in the second direction D2 within a range of a length of the second guide portion G2. The object to be suspended Q can be suspended via the body portion 220 below a space between a first portion 112A and a second portion 112B in the plate-shaped body 112 of the fixed portion 110. Therefore, for example, even when equipment S is installed in the ceiling C, the object to be suspended Q can be suspended below the equipment S. Vertical lengths of the first suspending portion 111A, the second suspending portion 111B, and the third suspending portion 111C are designed so that the body portion 220 is arranged at a height that prevent an interference with the equipment S. Therefore, degree of freedom of a suspending position of the object to be suspended Q suspended from the ceiling C can be increased.

Figure 10:
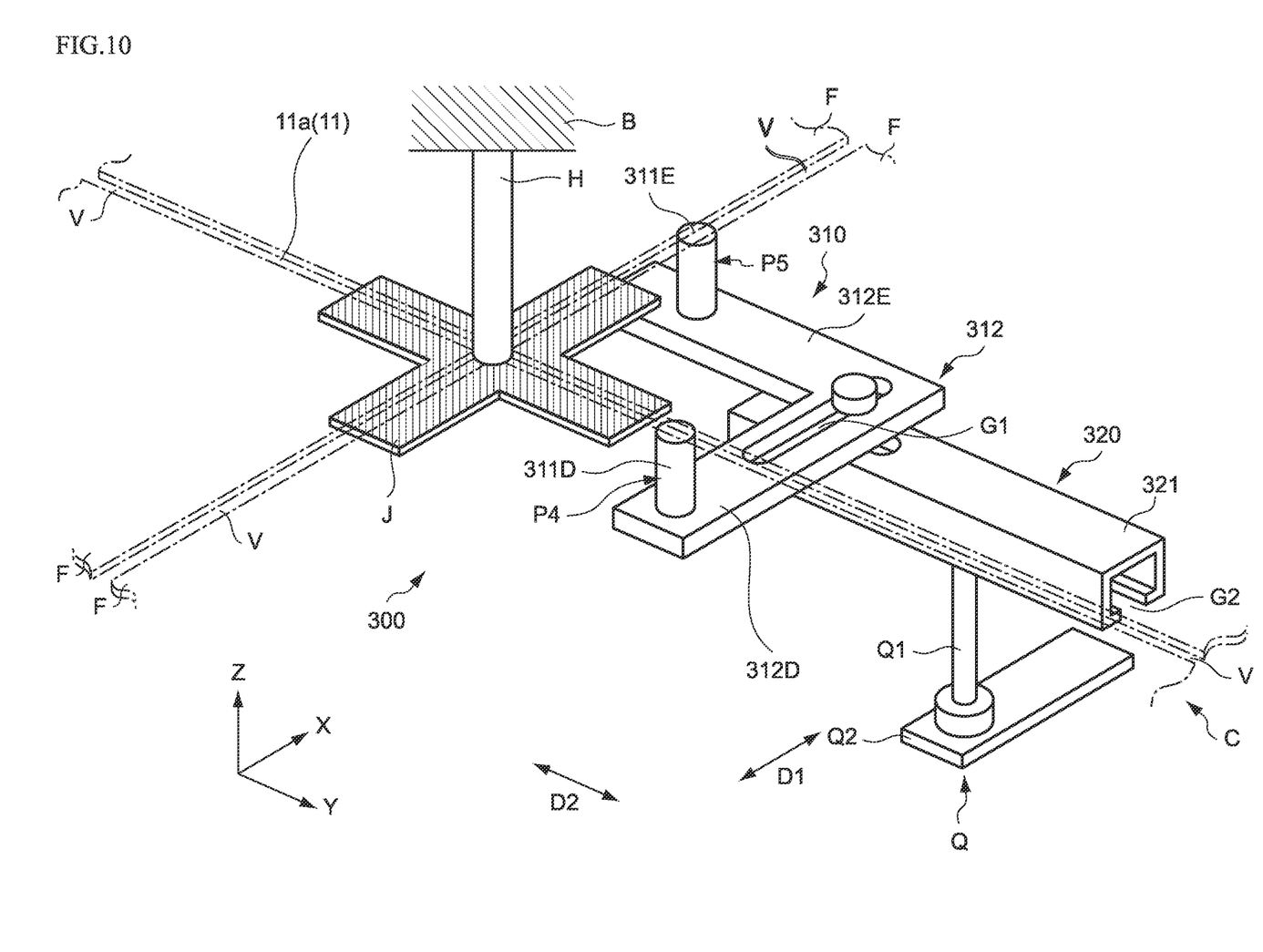
FIG. 10 is a perspective view illustrating an example of a suspender 300.

FIG. 10 is a perspective view illustrating an example of a suspender 300 of a third example. The suspender 300 include a fixed portion 310 and a body portion 320.

The fixed portion 310 is fixed to multiple places in the groove V. The fixed portion 310 includes a fourth suspending portion 311D, a fifth suspending portion 311E and a plate-shaped body 312.

The fourth suspending portion 311D is fixed to a fourth position P4 in the groove V. The fifth suspending portion 311E is fixed to a fifth portion P5 in the groove V. The fifth portion P5 is a position different from the fourth position P4. The fourth suspending portion 311D and the fifth suspending portion 311E are arranged in a state where they have the same heights of their lower ends.

The plate-shaped body 312 is fixed to lower ends of a plurality of suspending portions 311. The plate-shaped body 312 includes a fourth portion 312D and a fifth portion 312E. The fourth portion 312D is fixed to a lower portion of the fourth suspending portion 311D and extends in the first direction D1. The fifth portion 312E is fixed to a lower portion of the fifth suspending portion 311E and extends in the second direction D2. The fifth portion 312E is connected to the fourth portion 312D. In the plate-shaped body 312, for example, the fourth portion 312D and the fifth portion 312E are arranged to form an L-shape in a plan view.

The first guide portion G1 is provided at the fourth portion 312D. The first guide portion G1T connects the fixed portion 310 and the body portion 320 to each other. The first guide portion G1 is an opening portion that vertically penetrates the plate-shaped body 312. The first guide portion G1 extends in the first direction D1. For example, a connecting position of the body portion 320 with respect to the fixed portion 310 can be changed within a length of the first guide portion G.

The body portion 320 is connected to the fixed portion 310 and suspends an object to be suspended Q. The body portion 320 includes a third raceway 321. The third raceway 321 is connected to the first guide portion G1 of the fourth portion 312D. The third raceway 321 extends in the second direction D2.

The third raceway 321 includes the second guide portion G2. The second guide portion G2 is an opening portion that vertically penetrates a bottom portion of the third raceway 321. The second guide portion G2 extends in the second direction D2. The suspension metal fitting Q1 of the object to be suspended Q is vertically inserted into the second guide portion G2. The hanger Q2 is fixed to a lower end of the suspension metal fitting Q1 via a fixing member such as a nut. The second guide portion G2 can change a position of the suspension metal fitting Q1 in the second direction D2. Changing a position of the suspension metal fitting Q1 in the second direction D2 enables a change of a connecting position of the object to be suspended Q with respect to the body part 320 in the second direction D2.

A suspender 300 of the third example can change a position of the object to be suspended Q with respect to the fixed portion 310 within a length of the first guide portion G1 in the first direction D1. Further, the suspender 300 of the third example can change a position of the object to be suspended Q with respect to the fixed portion 310 within a length of the second guide portion G2 in the second direction D2. The third raceway 321 is guided by the first guide portion G1 in the first direction D1, thus enabling an increase in degree of freedom of a position to suspend the object to be suspended Q from the second guide portion G2 of the third raceway 321.

Figure 11:
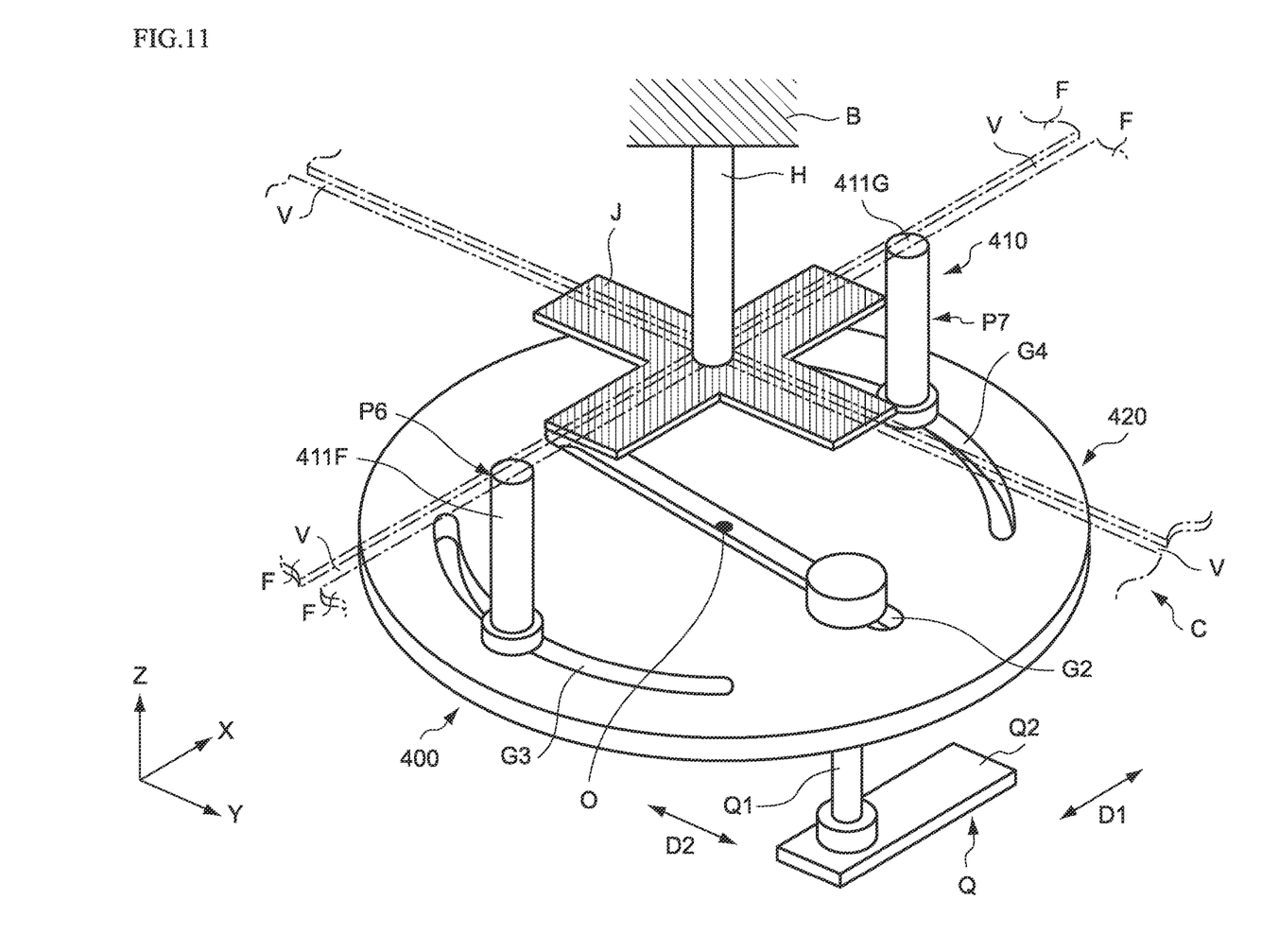
FIG. 11 is a perspective view illustrating an example of a suspender 400.
Figure 12:
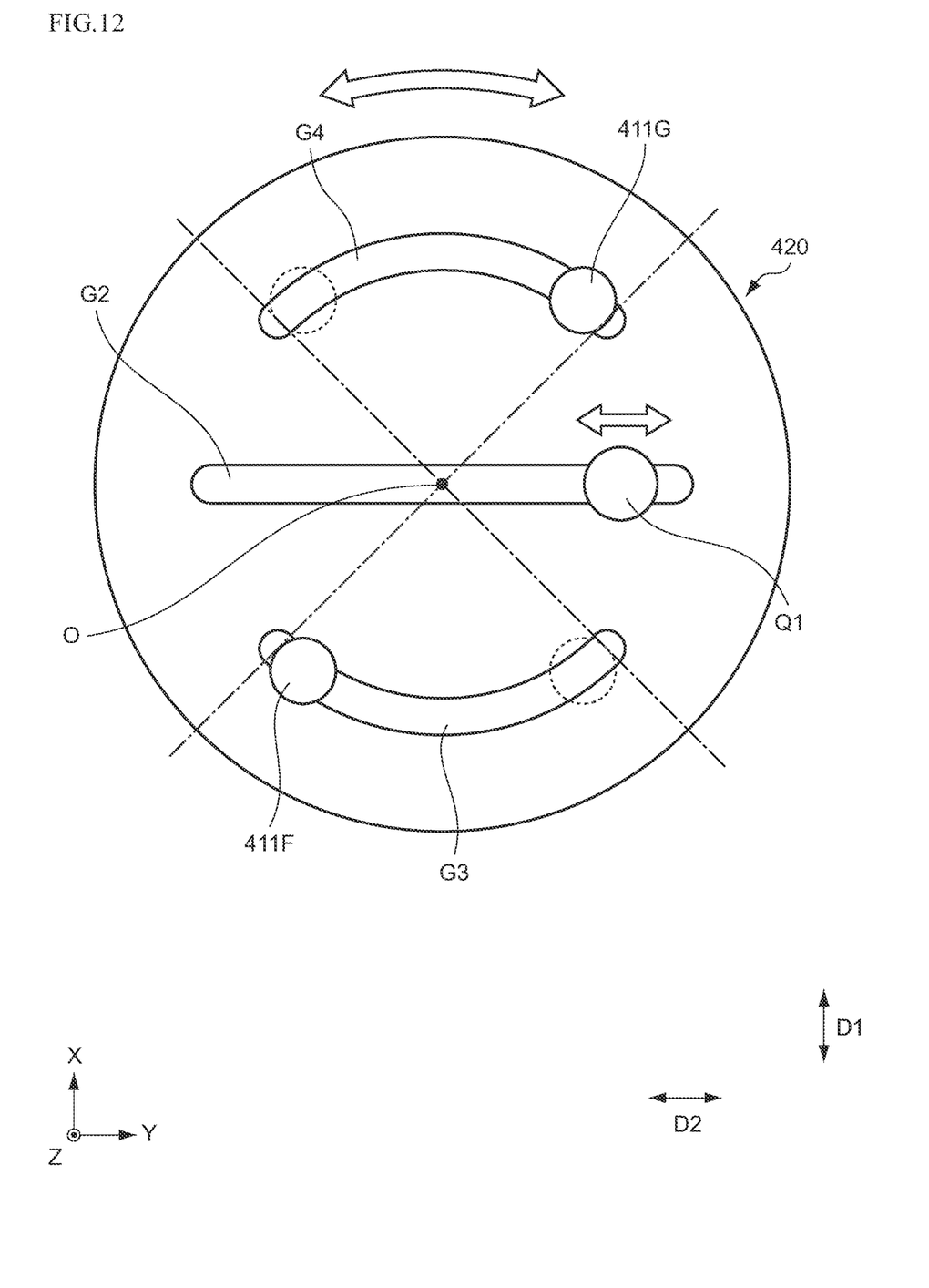
FIG. 12 is a plan view illustrating an example of a suspender 400.

FIG. 11 is a perspective view illustrating an example of a suspender 400 of a fourth example. FIG. 12 is a plan view illustrating an example of a suspender 400. The suspender 400 includes a fixed portion 410 and a body portion 420.

The fixed portion 410 is fixed to multiple places in the groove V. The fixed portion 410 includes a sixth suspending portion 411F and a seventh suspending portion 411G.

The sixth suspending portion 411F is fixed to a sixth position P6 in the groove V. A seventh suspending portion 411G is fixed to a seventh position P7 in the groove V. The seventh position P7 is a different position from the sixth position P6. The sixth suspending portion 411F and the seventh suspending portion 411G are arranged in a state where they have the same heights of their lower ends.

The body portion 420 is connected to the fixed portion 410 and suspends an object to be suspended Q. The body portion 420 is a plate-shaped member fixed to lower ends of a plurality of suspending portions 411 and expanding in a horizontal direction. For example, the body portion 420 has a round shape in a plan view. The shape of the body portion 420 in a plan view is not limited to a round shape. It may be a multangular shape such as a triangle shape or a rectangular shape, or an elliptical shape.

The body portion 420 includes a first arc-shaped guide portion G3, a second arc-shaped guide portion G4, and the second guide portion G2. The first arc-shaped guide portion G3 and the second arc-shaped guide portion G4 are examples of "the first guide portion." The first arc-shaped guide portion G3 and the second arc-shaped guide portion G4 have an arc shape centering on a common point 0 and are arranged face to face at both sides of the point 0 in a plan view. For example, the point 0 may be arranged at the center of the body portion 420 which has a circular shape in a plan view. For example, the first arc-shaped guide portion G3 and the second arc-shaped guide portion G4 are provided within a range of 90-degree centering on the point 0. However, this disclosure is not limited thereto. The first arc-shaped guide portion G3 and the second arc-shaped guide portion G4 may be provided within a range of an angle smaller than 90-degree or an angle larger than 90-degree. The first arc-shaped guide portion G3 and the second arc-shaped guide portion G4 are opening portions that vertically penetrate the body portion 420. A connecting position of the body portion 420 with respect to the fixed portion 410 can be changed within a range of lengths of the first arc-shaped guide portion G3 and the second arc-shaped guide portion G4.

The second guide portion G2 is a straight line, for example, and extends between the first arc-shaped guide portion G3 and the second arc-shaped guide portion G4. The second guide G2 is provided in an area including the point 0. The second guide portion G2 is an opening portion that vertically penetrates the body portion 420. The suspension metal fitting Q1 of the object to be suspended Q is vertically inserted into the second guide portion G2. The hanger Q2 is fixed to a lower end of the suspension metal fitting Q1 via the fixing member such as a nut. The second guide portion G2 can change a position of the suspension metal fitting Q1 in the second direction D2. Changing a position of the suspension metal fitting Q1 in the second direction D2 enables a change of a connecting position of the object to be suspended Q with respect to the body portion 420 in the second direction D2.

In the suspender 400 of a fourth example, degree of freedom of a suspending position of the object to be suspended Q suspended from the second guide portion G2 can be increased by rotating the plate-shaped body portion 320 centering on the common point 0.

As described above, our suspenders are described using examples. However, a technical range of this disclosure is not limited thereto. It will be apparent to those skilled in the art that various modifications or improvements can be added to the above-described examples. Matters described concerning a specific example can be applied to other examples to the extent that they are not technologically inconsistent. It is apparent that an example to which such modifications or improvements have been added can also be included in a technical range of this disclosure. Further, the contents of Japanese Patent Application No. 2020-179085 and all the documents cited in the above-mentioned examples are incorporated herein by reference.

The invention claimed is:

1. A suspender configured to suspend an object to be suspended via a grid-shaped groove provided at a ceiling included in a building, comprising:
   a fixed portion fixed to multiple places in the grid-shaped groove; and
   a body portion connected to the fixed portion and configured to suspend the object to be suspended, wherein
   a first guide portion configured to connect the fixed portion and the body portion to each other and extending in a first direction is provided at the fixed portion or the body portion,
   a connecting position of the body portion with respect to the fixed portion is changeable within a range of a length of the first guide portion,
   a second guide portion configured to suspend the object to be suspended and extending in a second direction different from the first direction is provided at the body portion, and
   a suspending position of the object to be suspended with respect to the body portion is changeable within a range of a length of the second guide portion.

2. The suspender according to claim 1, wherein
the first direction is parallel to a groove extending in a predetermined direction out of the grid-shaped groove, and
the second direction is parallel to a groove extending in a direction intersecting with the predetermined direction out of the grid-shaped groove.

3. The suspender according to claim 1, wherein the fixed portion includes a plurality of suspending portions fixed to the groove and a plate-shaped body attached to lower ends of the plurality of suspending portions and expanding horizontally.

4. The suspender according to claim 3, wherein the plurality of suspending portions includes:
   a first suspending portion fixed to a first position in the groove;
   a second suspending portion fixed to a second position in the groove, the second position different from the first position; and
   a third suspending portion fixed to a third position in the groove, the third position different from the first position and the second position,
   the plate-shaped body includes:
   a first portion fixed to a lower portion of the first suspending portion and extending in the first direction;
   a second portion fixed to a lower portion of the second suspending portion and extending in the first direction; and
   a third portion fixed to a lower portion of the third suspending portion, extending in the second direction, and connected to each of the first portion and the second portion, and
   the first guide portion is provided at each of the first portion and the second portion.

5. The suspender according to claim 4, wherein the body portion includes:
   a first raceway connected to the first guide portion of the first portion and extending in the second direction; and
   a second raceway separately from the first raceway, connected to the first guide portion of the second portion, and extending in the second direction, and
   the first raceway and the second raceway each include the second guide portion.

6. The suspender according to claim 5, wherein
the body portion includes a straight member connected to each of a lower end of the first raceway and a lower end of the second raceway, and extending in the second direction, and
the straight member includes the second guide portion.

7. The suspender according to claim 5, wherein
the body portion is connected to each of the first guide portion of the first portion and the first guide portion of the second portion and extends in the second direction, and
the second guide portion is provided at the body portion.

8. The suspender according to claim 3, wherein the plurality of suspending portions include:
   a fourth suspending portion fixed to a fourth position in the groove; and
   a fifth suspending portion fixed to a fifth position in the groove, the fifth position different from the fourth position,
   the plate-shaped body includes:
   a fourth portion fixed to a lower end of the fourth suspending portion and extending in the first direction; and
   a fifth portion fixed to a lower end of the fifth suspending portion, extending in the second direction, and connected to the fourth portion,
   the first guide portion is provided at the fourth portion,
   the body portion includes a third raceway connected to the first guide of the fourth portion and extending in the second direction, and
   the third raceway includes the second guide portion.

9. The suspender according to claim 1, wherein the fixed portion includes:
   a sixth suspending portion fixed to a sixth position in the groove; and
   a seventh suspending portion fixed to a seventh position in the groove, the seventh position different from the sixth position,
   the body portion is a plate-shaped member attached to lower portions of the sixth suspending portion and the seventh suspending portion and expanding horizontally, and includes:
   a first arc-shaped guide portion that is the first guide portion corresponding to the sixth suspending portion;
   a second arc-shaped guide portion that is the first guide portion corresponding to the seventh suspending portion; and
   the second guide portion extending straight,
   the first arc-shaped guide portion and the second arc-shaped guide portion have an arc shape centering on a common point and face each other with the common point interposed therebetween, and
   the second guide portion extends between the first arc-shaped guide portion and the second arc-shaped guide portion in a plan view.

* * * * *